United States Patent
Masberg et al.

(10) Patent No.: US 6,365,983 B1
(45) Date of Patent: Apr. 2, 2002

(54) STARTER/GENERATOR FOR AN INTERNAL COMBUSTION ENGINE, ESPECIALLY AN ENGINE OF A MOTOR VEHICLE

(75) Inventors: Ullrich Masberg, Rösrath; Thomas Pels, Achern; Klaus-Peter Zeyen, Köln; Andreas Gründl, München; Bernhard Hoffmann, Starnberg, all of (DE)

(73) Assignees: ISAD Electronic Systems GmbH & Co. KG, Cologne; Grundl und Hoffman GmbH, Starnberg, both of (DE)

( * ) Notice: Subject to any disclaimer, the term of this patent is extended or adjusted under 35 U.S.C. 154(b) by 0 days.

(21) Appl. No.: 09/651,562

(22) Filed: Aug. 30, 2000

Related U.S. Application Data

(62) Division of application No. 09/032,323, filed on Feb. 27, 1998, which is a continuation of application No. PCT/DE96/01622, filed on Aug. 31, 1996.

(30) Foreign Application Priority Data

Aug. 31, 1995 (DE) .......................... 195 32 163
Aug. 31, 1995 (DE) .......................... 195 32 135

(51) Int. Cl.$^7$ .............................................. F02N 15/00
(52) U.S. Cl. ..................................... 290/40 C; 322/14
(58) Field of Search ............................ 290/36 R, 37 A, 290/38 R, 40 R, 40 C, 46; 322/10, 11, 14; 310/113

(56) References Cited

U.S. PATENT DOCUMENTS

| | | | |
|---|---|---|---|
| 2,654,849 A | 10/1953 | Trofimov | 310/99 |
| 2,790,917 A | 4/1957 | Trofimov | 310/102 |
| 3,774,303 A | 11/1973 | Burkett et al. | 30/382 |
| 3,870,116 A | 3/1975 | Seliber | 180/54 R |

(List continued on next page.)

FOREIGN PATENT DOCUMENTS

| | | |
|---|---|---|
| DE | 3013424 A1 | 10/1981 |
| DE | 3048972 A1 | 7/1982 |
| DE | 3243513 A1 | 5/1984 |
| DE | 3737192 A1 | 7/1988 |
| DE | 4318949 C1 | 6/1994 |
| DE | 4339252 A1 | 6/1994 |
| DE | 4323601 A1 | 1/1995 |
| DE | 4323602 A1 | 1/1995 |
| EP | 0175952 A2 | 4/1986 |

*Primary Examiner*—Nicholas Ponomarenko
(74) *Attorney, Agent, or Firm*—Blakely, Sokoloff, Taylor & Zafman

(57) ABSTRACT

The invention concerns a starter/generator for an internal combustion engine (1), especially that of a motor vehicle, with an electric rotary-field machine (4), which exercises the starter and generator function; and at least one invertor (17) for generating the voltages and/or currents of variable frequency, amplitude and/or phase required for the magnetic fields of the electric machine (4); wherein the electric machine (4) starts the internal combustion engine (1) by merging in from standstill.

4 Claims, 5 Drawing Sheets

U.S. PATENT DOCUMENTS

| | | | |
|---|---|---|---|
| 3,902,073 A | 8/1975 | Lafuze | 290/46 |
| 3,974,396 A | 8/1976 | Schönball | 290/54 |
| 4,025,860 A | 5/1977 | Shibata et al. | 320/3 |
| 4,066,936 A | 1/1978 | Hirota | 318/139 |
| 4,346,773 A | 8/1982 | Hofbauer et al. | 180/165 |
| 4,699,097 A | 10/1987 | Tanaka et al. | 123/192 |
| 4,797,602 A | 1/1989 | West | 322/10 |
| 4,803,376 A * | 2/1989 | N'Guyen | 290/22 |
| 4,825,139 A | 4/1989 | Hamelin et al. | 322/90 |
| 4,883,973 A * | 11/1989 | Lakey et al. | 290/31 |
| 4,942,950 A | 7/1990 | Watanabe et al. | 192/96 |
| 4,948,997 A * | 8/1990 | Ohmitsu et al. | 310/113 |
| 4,958,095 A | 9/1990 | Uchida et al. | 310/59 |
| 5,053,632 A | 10/1991 | Suzuki et al. | 290/45 |
| 5,075,616 A * | 12/1991 | Mitsui | 322/10 |
| 5,109,815 A | 5/1992 | Maeda et al. | 123/192.1 |
| 5,125,236 A | 6/1992 | Clancey et al. | 62/115 |
| 5,126,641 A | 6/1992 | Putman et al. | 318/128 |
| 5,175,439 A | 12/1992 | Härer et al. | 307/10.1 |
| 5,285,111 A * | 2/1994 | Sherman | 290/4 C |
| 5,303,794 A | 4/1994 | Hrovat et al. | 180/197 |
| 5,323,743 A | 6/1994 | Kristiansson | 123/179.3 |
| 5,325,042 A | 6/1994 | Murugan | 322/10 |
| 5,359,308 A | 10/1994 | Sun et al. | 335/216 |
| 5,431,241 A | 7/1995 | May et al. | 180/197 |
| 5,493,201 A * | 2/1996 | Baker | 322/10 |
| 5,512,811 A * | 4/1996 | Latos et al. | 322/10 |
| 5,545,928 A * | 8/1996 | Kotani | 290/40 C |
| 6,148,784 A * | 11/2000 | Masberg et al. | 123/192.1 |
| 6,149,544 A * | 11/2000 | Masberg et al. | 477/13 |
| 6,158,405 A * | 12/2000 | Masberg et al. | 123/192.1 |
| 6,177,734 B1 * | 1/2001 | Masberg et al. | 290/31 |

* cited by examiner

STARTER/GENERATOR FOR AN INTERNAL COMBUSTION ENGINE, ESPECIALLY AN ENGINE OF A MOTOR VEHICLE

This is a divisional of U.S. patent application Ser. No. 09/032,323 which was filed on Feb. 27, 1998, which is a continuation of PCT/DE96/01622 filed on Aug. 31, 1996 which claims priority from a German Patent Application No. 195 32 135.9 filed on Aug. 31, 1995 and from German Patent Application No. 195 32 163.4 filed on Aug. 31, 1995.

BACKGROUND OF THE INVENTION

1. Field of the Invention

The invention concerns a starter/generator for an internal combustion engine, especially an engine of a motor vehicle.

2. Description of the Related Art

The invention concerns a starter/generator for an internal combustion engine, especially an engine of a motor vehicle.

Motor vehicles and other vehicles outfitted with internal combustion engine generally require an electric starter to start the engine, as well as a generator to supply electrical consumers and to charge a battery, which furnishes the electrical energy needed for the starting, among other things. Since the dawn of automotive engineering, starter and generator have generally been two separate electric machines, which are especially adapted to their particular functions. A starter must produce relatively high torques at relatively low engine rotary speed and is therefore traditionally geared up relative to the engine. It is not constantly running, but is only coupled to the engine for the starting process. On the other hand, a generator runs constantly with the engine and achieves high rotary speed at relatively high transmission ratio.

The combination of these two functions in one and the same electric machine is a worthy goal, since in this way one of the two traditionally necessary machines can be economized.

One possibility of combining the starter and generator despite the different requirements of the two machines is known from G. Henneberger: "Electrical Engine Equipment," Vieweg, Braunschweig 1990, p. 98–103. According to this proposal, the electric machine, which is an invertor-controlled rotary-field machine—does not start the internal combustion engine itself, but rather accelerates a flywheel (in the beginning decoupled from the engine). Upon reaching a sufficiently high speed, the flywheel is coupled to the crankshaft of the engine by means of a frictional coupling. The rotational energy stored in the flywheel then turns over the engine. In generator mode, the electric machine is permanently coupled to the engine by the frictional coupling. This solution has the advantage that the powers and torques of the electric machine are similar during starting and in generator mode. The disadvantage, however, is the large mechanical load of the frictional coupling when engaging the fast-running flywheel, resulting in wear on the coupling, among other things, as well as a dead time prior to each starting process, which is needed to accelerate the flywheel.

SUMMARY OF THE INVENTION

The invention concerns a starter/generator for an internal combustion engine (1), especially that of a motor vehicle, with an electric rotary-field machine (4), which exercises the starter and generator function; and at least one invertor (17) for generating the voltages and/or currents of variable frequency, amplitude and/or phase required for the magnetic fields of the electric machine (4); wherein the electric machine (4) starts the internal combustion engine (1) by merging in from standstill.

BRIEF DESCRIPTION OF THE DRAWINGS

The invention shall now be explained more closely by means of sample embodiments and the enclosed schematic drawing. The drawing shows.

Figure 1:
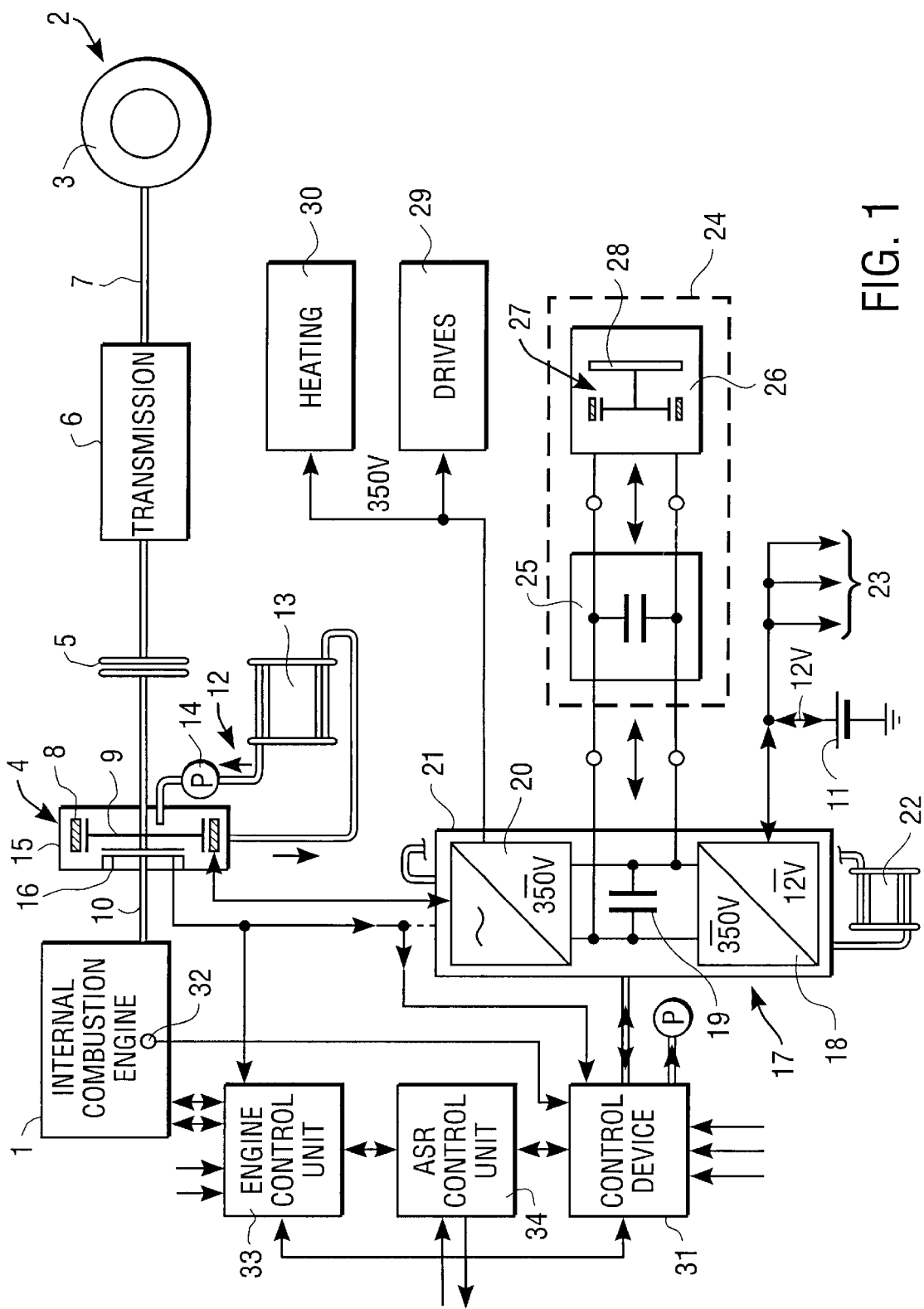
FIG. 1 a not-to-scale schematic representation of a drive system with one embodiment of the starter/generator.

In the figures, parts essentially identical in function bear the same references.

DETAILED DESCRIPTION OF THE EMBODIMENTS

The invention takes a different path in providing a starter/generator for an internal combustion engine based on a common electric machine, in particular, an engine of a motor vehicle. Namely, the starter/generator of the invention has an electric rotary-field machine, which performs the starter and generator functions; and at least one invertor for generating the voltages and/or currents of variable frequency, amplitude and/or phase, required for the magnetic fields of the electric machine;

wherein the electric machine starts the engine by merging in from standstill.

When "merging in," the ratio of the momentary rotary speeds of the electric motor and the drive assembly—unlike the case of a flywheel starter—remains essentially constant (and in particular, its value is unity). Merging in "from standstill" means that the electric machine and the drive assembly—unlike the case of the aforesaid flywheel starter—run up together from standstill.

An "electric machine" is any kind of machine for rotational movement, which can be operated as both an electric motor and an electric brake, or a generator if necessary. By "rotary-field machine"—in contrast with a commutator machine—is meant in particular a noncommutator machine in which a rotary magnetic field occurs, which preferably sweeps through 360.

The invertor can generate the voltages and/or currents needed for the magnetic fields with any desired (within certain limits) frequency, amplitude or phase.

The starter/generator according to the invention has the following advantages. Thanks to the merging in from standstill the starting occurs quickly and without dead time, the starter/generator is practically free of wear and tear, the starter/generator achieves a relatively high efficiency (since no energy is consumed on heating and wearing down the coupling), the coupling between internal combustion engine and electric machine can be eliminated.

As compared to vehicles with traditional separate starter and generator machines, the invention provides a distinct reduction in weight.

The electric machine of the invented starter/generator runs—unlike a traditional starter—preferably permanently with the engine. Therefore, it can do without the single-track and freewheeling device which is required in the former.

Preferably, the relative rotary speeds of engine and electric machine are equal in starter and generator operation. This means that the transmission ratio of the electric machine is equal in both operating modes, and is not reduced, say, when switching from starter to generator operation.

Basically, the coupling of the electric machine to a drive shaft of the engine can be indirect, e.g., through a transmission. Preferably, however, the electric machine is directly coupled or can be coupled to the drive shaft of the engine (e.g., the crankshaft) or a drive train (e.g., the drive shaft of a coupling or a gear shift transmission or automatic transmission). By a "direct coupling" is meant, in particular, a transmission-free coupling of the rotor of the electric machine to the drive shaft. Thus, it is not an indirect coupling by pinion or chains or belts. The rotary speed of the rotor is preferably equal to that of the engine.

Especially preferred is a configuration in which the electric machine is seated on the drive shaft or a possibly coupleable extension and firmly joined to it. The advantages are relatively lower expenditure because of the small number of moving and force-transmitting parts, no wear and tear, and completely noise-free starting.

The electric rotary-field machine is preferably an induction machine, a synchronous, or a reluctance machine, especially for rotary-current, e.g., three-phase current. An induction machine generally has a relatively simple rotor (generally a rotor with short-circuit windings or windings whose ends go to slip rings), in which currents are induced by the magnetic rotary fields of the stator, which lead or trail the motion of the rotor. It therefore has advantages in respect of manufacturing costs and mechanical load capability, but its control engineering is relatively complicated, since magnitude and phase angle of the rotor current can only be calculated as a function of load, but not measured directly in terms of stator quantities. On the other hand, synchronous machines have rotors with given distinct poles, which are created by permanent magnets or electromagnets. The electromagnets can be energized with current by slip rings, for example. Synchronous machines have generally higher production costs, but they are easier to control, since the torque in them is substantially dependent on the rotor angle, which can be directly measured by means of a rotor position pickup. Moreover, they require less expense in the power electronics, can be designed more compactly, have less need for return cooling and achieve better efficiency. Reluctance machines belong to the synchronous machines in the broad sense.

In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque. This control method allows one to adjust a desired torque with high precision—even though the current relationships in the rotor are not directly measurable.

The starter/generator according to the invention is an auxiliary system coordinated with the engine. Because of its auxiliary nature, it should take up little room relative to the engine, i.e., be as compact as possible. The starter/generator should be able to produce relatively high torque for starting and should have the highest possible efficiency for the generator function. The advantageous features mentioned hereafter serve to produce a compact construction with large torque output and high efficiency.

One feature for accomplishing high compactness is for the rotary field-generating component of the electric machine (that is, generally the stator) to have at least 8 magnetic poles (in terms of 360). Even smaller pole divisions are especially advantageous, corresponding to 10, 12, 14, 16 or more poles (in a closed-circle machine). For the type and manner of implementing rotary-current windings with a particular number of poles, refer, for example, to G. and H. Häberle: "Electrical Machines in Power Engineering Systems," Verlag Europa-Lehrmittel, Haan-Gruiten, 3rd Edition, 1994, pp. 169–172.

A high number of poles makes it possible to have small winding heads for the stator, both in the axial and the peripheral direction of the machine, so that ii the machine can be shorter overall in the axial direction. Preferably, the axial projection of the winding heads on either side of the stator is only 5–25 mm, especially 10–20 mm. The axial width of the stator back is preferably 25–100 mm. With a projection of 2 by 15 mm and a back width of 40 mm, there is for example a total axial width of 70 mm for the stator, while the ratio of back width to total width is 0.57. Preferably, this ratio lies between 0.4 and 0.8, especially preferably between 0.55 and 0.8. Besides the advantage of a more compact configuration of the machine, the resistance losses are lower on account of the shorter length of the winding wire—smaller winding heads require less nonactive winding wire. Moreover, the scatter field (essentially determined by the reactive power component) is smaller, since it depends on the winding head surface.

A fine pole division enables, among other things, a thinner stator back for the magnetic reflux (and, thus, also a lighter one), with the result that the rotor can have a larger diameter for the same outer diameter of the machine. A larger rotor diameter leads to a larger torque on account of the longer air gap in the peripheral direction and the larger effective lever arm. The thickness of the back in the radial direction, which is comprised of the height of the teeth and the thickness of the continuous back piece, is advantageously 10–50 mm, preferably 15–30 mm, and especially favorably is less than or equal to 25 mm. The outer diameter of the back is preferably 230–450 mm and especially preferably 250–350 mm. The ratio of twice the back thickness to the outer diameter of the back is preferably 0.05–0.25 and especially preferably 0.1–0.2. For example, a machine with a back outer diameter of 300 mm has a tooth height of 15 mm and a thickness of the continuous back piece of 10 mm, thus, on the whole, a back thickness of 25 mm. The above ratio then amounts to 50 mm to 300 mm, i.e., 0.167.

Thus, on the whole, a fine pole division, small winding heads, and a thin stator back result in a more compact and lighter machine.

Large numbers of poles are not customary for high-speed rotary-field machines, since they result in a relatively high frequency of pole reversals. A customary value for the pole reversal frequency is 120 Hz, for example. The electric machine used in the context of the invention, on the other hand, preferably has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. The fluid can be gas (e.g., air), or preferably a liquid (e.g., oil). One cooling technique consists in placing the machine entirely under cooling fluid in the interior (i.e., in the space accommodating the rotor). However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and it is preferably done by a spray fluid cooling. There is then always only as much cooling fluid in the machine as is required at the time to carry away the loss power. At very high loss power and/or low rotary speed, the entire machine can be placed under cooling fluid. The spray fluid cooling ensures an extremely effective heat transfer and an especially good distribution of the fluid.

The electric machine preferably has its own closed cooling fluid circulation. To carry away the heat to the outside (e.g., to the atmosphere), this can have an independent recooler (e.g., an air cooler). But this can also be a parasitic recooler, which takes the exhaust heat to another cooling system, which can be, for example, the engine or transmission oil cooling circuit of a motor vehicle. The waste heat is then surrendered to the outside through the recooler of the other cooling system. The parasitic recooler can have a very simple and compact design, e.g., in the form of a cooler that is dipped into the cooling fluid ii of the other cooling system and requires only a relatively small surface on account of the good heat transfer. As an alternative, however, the electric machine need not have its own self-contained cooling circuit, but instead can be integrated in another cooling circuit, perhaps a transmission oil cooling circuit.

In order to accomplish especially high torque, the electric machine works preferably far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Another measure for the magnetic saturation is the so-called flattening factor: This indicates how strong the ratio of peak value to the arithmetic mean value of the magnetic field is for a sinusoidal excitation current. For a purely sinusoidal curve, this amounts to 1.57, for conventional electric machines it is around 1.35, and in this preferred embodiment it is 1.05–1.15. Working far in the saturation region has the further advantage that the machine can have a relatively broad air gap between the active units (i.e., rotor and stator). The width of the air gap is preferably 0.25–2.5 mm, preferably 0.5–1.5 mm, and especially preferably 0.75–1.5 mm. Changes in the air gap—such as occur during radial vibrations of the shaft carrying the rotor—have little effect, due to the operation in the saturation range. Besides robustness to radial vibrations, this provision also allows a lowering of the precision requirements and, thus, considerable simplification in the manufacture of the electric machine.

Quantitatively, the compactness can be expressed in terms of the "torque density." Preferably, the electric machine has a high torque density—as compared to the maximum torque—which is especially preferably greater than 0.01 $Nm/cm^3$.

Such a compact-construction electric machine generally has relatively low inductance. Yet in order to achieve, for example by means of a synchronized voltage, the most smooth sinusoidal current to generate the electrical rotary fields, the invertor preferably works at least sometimes with a high cycle frequency, in particular, 10 kHz to 100 kHz, especially 20 KHZ to 100 kHz or more. A high cycle frequency also has the advantage of enabling a compact construction for the invertor itself: Since, for example, in a voltage intermediate-circuit invertor, the capacitance in the intermediate circuit, which provides the intermediate circuit voltage for the electronic switches of the invertor, is inversely proportional to the frequency, so that a smaller capacitance will suffice for this at higher cycle frequency. The smaller intermediate circuit capacitors can be placed directly next to the electronic switches with short conductor pathways. Moreover, a necessary EMC filtering (EMC: electromagnetic compatibility) of the invertor can be more compact, since the size of the filter is inversely proportional to the cycle frequency.

By an "intermediate circuit" is meant a circuit which can supply essentially dc voltage or direct current, from which an invertor component (the so-called machine invertor) can form variable alternating voltage or current by pulse or cycle operation. This dc voltage or this direct current must therefore be furnished with very steep edges. A car battery is usually too slow for this, and therefore one uses a capacitor as the energy accumulator in the intermediate circuit. Generally speaking, an intermediate invertor comprises three subassemblies, namely, an input subassembly for supplying or taking away electrical energy, an output subassembly in the form of the machine invertor, and the intermediate circuit which comes between these.

As a further advantageous provision for achieving a compact construction of the invertor, electronic switches of the invertor are fluid-cooled, preferably boiling bath cooled. As the boiling bath coolant, one can use a fluorohydrocarbon, for example. In boiling bath cooling, the liquid coolant evaporates at heat sources and in this way obtains its relatively high heat of evaporation from them. The vapor rises and can condense, for example, in an external cooler, thereby surrendering its heat of evaporation. This cooling technique enables the most compact arrangement of the electronic switches of the invertor without any cooling body. Furthermore, it has the advantage that relatively slight temperature differences are enough to achieve even high cooling performance: whereas in the case of air cooling a temperature difference of 40 C is usually necessary between cooling surface and the housing of a chip being cooled, here a difference of 2–10 C, especially around 5 C, is already enough. As a result, high ambient temperatures are tolerable, for example, an ambient temperature up to 60 C for a chip temperature of 65 C. The absence of cooling bodies and the high compactness which can be achieved furthermore allows good jolting resistance; moreover, the boiling bath enables the creation of an oxygen-free atmosphere in the region of the electronic components of the invertor, which generally tends to extend the lifetime. The housing which forms the cooling space—if it is not made of conducting material—can also serve as shielding. Electrical intermediate circuit accumulating elements for providing the voltage or current to be synchronized (e.g., the aforesaid capacitance) can be arranged inside the cooling housing, thus enabling short conductor lengths. A separate electrical brake energy accumulator, if necessary, can be arranged inside or outside the cooling housing. In the latter case, the possibly relatively high lead inductances are not a problem, since the brake energy accumulator operates on a relatively "slow" time scale.

Another advantageous cooling technique consists in connecting several electronic switches of the invertor, especially 2–20 or more, in parallel. The parallel circuit yields a distributed arrangement of heat sources and, thus, a relatively low loss power density.

The invertor preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow the aforesaid clock frequencies. MOS field effect transistors have the relatively lowest losses at high clock frequencies. They have an ohmic characteristic (whereas other semiconductor elements generally have a fixed loss characteristic), so that the losses are relatively low in partial load operation.

The invertor is preferably a pulse invertor, i.e., it generates the voltages and/or currents necessary for the magnetic fields of the electric machine, preferably through pulses, especially on the basis of pulse width or pulse amplitude modulation. It can do this advantageously by means of electronic switches, which cut out the pulses from a given dc or alternating voltage or a given direct or alternating current. For example, in an intermediate-circuit invertor with constant intermediate-circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an invertor with variable intermediate circuit voltage and thus generates pulses of different amplitude.

In order to furnish the high electric power required for the starting process without excessive load on the car battery, it is advantageous to provide an energy accumulator, which is charged with energy prior to the starting process and from which the required energy is then withdrawn in short time. For this, the invertor is preferably configured as an intermediate-circuit invertor, which has at least one energy accumulator in the intermediate circuit for the starting energy or is coupled to at least one such. The accumulator can be, in particular, an electrical, magnetic and/or electro-chemical accumulator, such as a capacitance, an inductance and/or a (quick) battery. Besides accumulating the starting energy, it can also serve other purposes. For example, it can save the energy required for the pulse operation of the invertor. (In the latter case, it could be combined with the usual intermediate-circuit accumulator.) Moreover, the configuration of the rectifier as an intermediate-circuit rectifier can be advantageous in any case—for example, even without accumulator for the starting energy and perhaps the braking energy.

In traditional motor vehicles, other vehicles, and also stationary drive assemblies, there are often auxiliary machines which—since they consume relatively high power—are mechanically driven by the drive assembly (i.e., by the engine), such as through belt drives. This may involve, for example, air conditioners, servo-drives (e.g., for braking and steering support), pumps or the like. Such a mechanical drive coupling is generally not optimal, since the auxiliary machine must follow the drive assembly through the speed conditions dictated by it. Thus, it does not run constant at its optimal operating quantity (e.g., the speed in the case of a rotary auxiliary machine) and, furthermore, it must also be running when this is not even necessary, due to no need for auxiliary power. These disadvantages can be overcome with the invented starter/generator, which can be configured as a high-power machine. Advantageously, the electric machine furnishes current at relatively high voltage level, preferably in the upper part of the low voltage region, where no special electrocution protection measures are necessary (e.g., around 60 V dc voltage). If one goes beyond this, a range of 250–450 Volts is preferably selected. The auxiliary machines are operated with electrical advantage at these high voltage levels. Such a high voltage level can already exist, in particular, in the intermediate circuit of an intermediate invertor, and thus need not be specially generated for this additional purpose. An electrical instead of a mechanical drive for auxiliary machinery is therefore possible, since relatively small currents result from the high voltage level (in contrast with the 12-Volt level of a traditional automotive network). With electrical drive, one can have the auxiliary machines run at their optimal speed when required and otherwise be shut off. Thus, one achieves a distinct increase in the overall efficiency. Advantageously, all appliances and auxiliary drives of a motor vehicle are electrically operated. The engine then serves only as the main propulsion motor for the vehicle, as well as the drive motor for the generator. For low-power consumers, a traditional low-voltage network (12 V or 24 V) can be provided. The car battery can be arranged in the region of the higher voltage level or, if necessary, the on-board low-voltage network.

It is also advantageous to provide an (additional) invertor to furnish 220 V alternating current and/or 380 V rotary current at customary network frequency (e.g., 50 Hz). This additional invertor can also be supplied from the (dc voltage) intermediate circuit. Such a vehicle enables the power supply of normal electrical network appliances and thus represents a mobile network current generator, which can be used with advantage in outdoor work, for example.

The conversion of electrical energy from the intermediate circuit into alternating current can also advantageously serve the power supply of an alternating voltage on-board network of the vehicle. Such a network has the advantage that any given voltages adapted to the particular consumers can be generated by transformers in the individual consumers from the on-board network voltage. With special advantage, the alternating voltage is high frequency (i.e., the frequency is greater than 1 kHz), since then the transformers can be especially small and lightweight.

The possibility of configuring the starter/generator as a high-power machine, possibly on a high voltage level, allows its use for heating purposes in the vehicle. This can be, for example, an electrical heating of the engine, e.g., by heating the cooling circuit (especially for winter operation of direct-injection turbo-diesel motors), a passenger space, an exhaust catalyst of the internal combustion engine, a fuel filter, a windshield washing system, exterior mirrors and/or window panes of the vehicle. Such heating systems are either not possible in traditional motor vehicles, or are only inadequate or only possible through waste heat of the engine. The electrical heating—apart from enhanced comfort, say, by supporting a passenger space heating—has advantageous effects for the environmental friendliness of motor vehicles: electrical engine and catalyst heating systems quickly bring the internal combustion engine or the catalyst up to operating temperature and, moreover, enable a precise and quick regulation of the operating temperatures. These are important features in fulfilling strict emission requirements. The control and regulation of the various heating systems, especially the engine and catalyst heating, can also be taken on by the control of the starter/generator for actuating the invertor.

Because of its low noise and wear, as well as the lack of a dead time, the starter/generator is suitable for very frequent starting. It will therefore be advantageously combined with a start/stop control of the internal combustion engine, in which the engine runs only when needed and otherwise is shut off. For in city traffic, the internal combustion engines of motor vehicles run a considerable portion of their operating time in idle mode, due to frequent halts at traffic lights and intersections. This represents a considerable waste of resources and a burden on the environment, since it entails a useless squandering of fuel with concomitant emission of toxic, climate-active, or otherwise harmful exhaust.

The automatic start/stop control preferably initiates an automatic stopping of the engine when a stop condition (or one of several) is fulfilled. Various conditions alone or in (sub) combination can serve to define a stop condition, such as: no load, shift operation, idling, standstill of the motor vehicle (i.e., traveling velocity below a particular low value, such as 4 km/h), engine disengaged, no gear engaged, the main brake or parking brake is activated, activation of a stop switch.

Correspondingly, the start/stop control preferably initiates an automatic starting of the internal combustion engine by means of the electric machine when a start condition (or one of several) exists. Again, various conditions alone or in (sub) combination can serve to define the start condition, such as: activation of the gas pedal, releasing of the main brake or parking brake, activation of the clutch, touching or moving a gear shift lever, engaging a gear, activation of a start switch.

Traditional starters on account of their high transmission ratio only bring the engine up to a relatively low starting speed (typically 80–250 rpm), which lies far below its idling speed (typically 600–800 rpm). The difference between starting speed and idling speed must then be overcome by the engine under its own power. For this, however—since at these speeds it is far below its idling speed in a very unfavorable operating range—it requires a relatively large amount of fuel, which moreover is only incompletely burned. Therefore, each starting of the engine involves additional fuel consumption and especially polluting emissions. Preferably, therefore, the drive system is configured such that the electric machine is in driving mode, at least essentially until reaching the idling speed of the internal combustion engine (which usually lies between 600 and 800 rpm at operating temperature). This provision allows the engine to start only when attaining its idling speed and thus eliminates the unfavorable running Up under its own power. In this way, it reduces the fuel consumption and the particularly harmful emissions during starting and also makes the starting process quicker. The provision is thus especially ecologically advantageous in vehicles with and without automatic start/stop system.

Advantageously, the electric machine can perform other functions besides its functions as starter and as generator:

A first advantageous extra function consists in that the electric machine produces or sustains an acceleration and/or braking of the shaft, for example, in order to accelerate or brake the motor vehicle. For the braking, the electric machine can serve as a wear-free, advantageously generator type (retarder) brake for energy recovery. In conjunction with an antislip control system, the electric machine can quickly diminish by braking the overall drive moment and, thus, the slip of one or more driving wheels. In the case of an additional driving torque to sustain the acceleration, the engine can be dimensioned more lightweight without changing the attainable vehicle acceleration values, so that on average it works at higher average pressure and therefore consumes less fuel. Thus, this provision as well contributes to reducing harmful emissions. The acceleration boosting can advantageously be controlled such that it smooths out the torque characteristic of the engine, for example, by applying a correspondingly larger additional torque in a speed range with relatively low torque (e.g., in the so-called "turbo-gap" of a turbo charged engine) than in other speed ranges.

As a second advantageous additional function, the electric machine works as an electromagnetic coupling in the drive train and/or as an active transmission synchronization device. It can be installed in place of or in addition to a traditional frictional clutch or a traditional hydrodynamic converter. In one advantageous embodiment, the electric machine as a whole is mounted so that it can turn, and thus it has a rotating stator in addition to the rotating rotor. One of these active elements (rotor or stator) is connected, for example, to the drive shaft coming from the engine, and the other, for example, to the takeoff shaft leading to the transmission. By setting a relative speed diminishing over time (i.e., a decreasing slip) between rotor and stator, the transient process as in the engagement of a frictional clutch is achieved. Vanishing clutch slip obtains at the end of the engagement. To avoid electrical losses, a mechanical bridge coupling can then be advantageously engaged. To achieve the generator function, one adjusts a slightly braking clutch slip—without bridge coupling. for the starting, the takeoff shaft is fixed, for example, by means of a brake device, against which the torque of the electric machine is buttressed during the starting. In the context of an antislip control, the drive slip can be reduced by increasing the coupling slip (after releasing the bridge coupling), instead of by braking. As an active transmission synchronizing mechanism, the electric machine is buttressed against the drive shaft and brakes or accelerates the takeoff shaft leading to the transmission, depending on what is required during a gear shift process to achieve a synchronization of transmission gears.

A third additional function consists in that the electric machine actively reduces rotational nonuniformities by generating a rapidly alternating torque in opposite phase to the rotational nonuniformities. This alternating torque can be additively superimposed on the constant or slowly varying torque of the generator function or, if necessary, the braking or booster function.

In particular, rotational nonuniformity can be such as occurs in an internal combustion engine (particularly a piston engine with internal combustion) through the gas and mass forces of the individual pistons acting on the crankshaft. For example, in a four-cylinder four-stroke engine, relatively large rotational nonuniformity occurs in the second order (i.e., twice the rotational frequency of the engine). Moreover, there are rotational nonuniformities at higher orders, as well as stochastically occurring nonuniformities.

For configurations in which the electric machine also acts as an electromagnetic coupling, a rapidly varying coupling slip of larger or smaller magnitude can take the place of the rapidly alternating braking and driving torque.

By "rapid" is meant a variation in the frequency range of the rotational nonuniformity being reduced, i.e., for the second-order rotational nonuniformity at a rotary speed of 3000 min$^{-1}$ a variation with a frequency of 100 Hz. In contrast, the torques belonging to the generator function or other of the above-mentioned functions generally vary slowly or they are constant. Therefore, they shall also be called "constant torques" hereafter.

If the amplitude of the alternating torque is greater than the constant or slowly varying torque, the overall torque of the electric machine—even though shifted relative to the zero line—shows alternately positive and negative values.

Otherwise, the overall torque is only positive or negative, and its magnitude contains a rapidly varying component.

The energy gained in these auxiliary functions (e.g., when braking the vehicle, starting with "grinding" clutch, slowing down of transmission gears, braking with positive rotational nonuniformity) is advantageously buffered in the above-mentioned (or a different) energy accumulator and recycled to produce driving moments (e.g., to accelerate the vehicle, speed up transmission gears, produce drive during a negative rotational nonuniformity) and/or furnished to an on-board network of the vehicle and/or a battery. If the energy accumulating is very large (as in the case of starting with "grinding" electromagnetic coupling), the energy accumulator can advantageously be designed as a flywheel accumulator, whose flywheel in turn is driven and braked by an electric machine. As an alternative, these large quantities of energy can be used as fuel, e.g., through an electric heating coil, which is arranged parasitically in the cooling circuit of the engine (similar to an immersion heater).

In order to achieve the highest possible efficiency of brake energy recovery when braking a vehicle with the help of the electric machine, one advantageously uncouples the electric machine from the engine while braking, e.g., with a coupling that is switched in between, such as a friction coupling or claw coupling.

For optimal utilization of the construction space available in a motor vehicle, for example, it is advantageous to integrate a coupling into the electric machine, especially into its rotor, preferably a friction coupling serving as a drive coupling. For example, in an induction and synchronous machine with interior rotor, the rotor can be nonfunctional in its inner zone and thus be designed hollow to accommodate the coupling. In this way, it is possible for the electric machine and the coupling integrated inside the rotor to require only as much space in the axial direction, or just a bit more, as the coupling itself in a conventional motor vehicle. Because of the reduced available diameter and to minimize the moment of inertia, a multiple disk and/or plate coupling design is also possible. If the integrated coupling is designed as a wet coupling, the coupling fluid can also provide for the cooling of the electric machine. Activation of the clutch can be mechanical, electrical, magnetic, electromagnetic, hydraulic, pneumatic, or mixed forms of these.

Furthermore, in all of the present specification, numerical indications "x" shall be understood in the sense of "at least x," and only preferably in the sense of "exactly x."

The drive system of a motor vehicle, such as a passenger car, represented in FIG. 1, has as its drive assembly an internal combustion engine 1, which can be a four-cylinder, four-stroke Otto or Diesel motor, for example. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: On the one hand, it functions as a. generator to charge a car battery 11 and to supply electrical consumers and thus replaces a dynamo traditionally present in the motor vehicle. On the other hand, it functions as a starter, which starts the internal combustion engine 1 by merging in from standstill and thus can also replace a separate starter traditionally provided in the motor vehicle. The electric machine 4 has additional optional functions: A generator function with substantially larger torque serves to brake the vehicle or the engine 1. Furthermore, the electric machine 4 can function as an auxiliary drive ("booster"), e.g., to support the engine when accelerating the vehicle. It can also serve as an active reducer of rotational nonuniformity (FIG. 2). Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a recooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization tank (not shown) enables this variation in the cooling fluid quantity in the housing 15. In other configurations (not shown), the cooler is a parasitic cooler, which is installed, for example, in the cooling circuit of the engine. In other configurations (not shown), the electric machine does not have its own self-contained cooling system. It (or only the rotor) is integrated in a coupling and/or transmission housing and cooled by a lubricating and/or cooling fluid (e.g., clutch or transmission oil) located therein.

In simpler embodiments (not shown), where the electric machine 4 need not carry out any additional functions with constant high power, the cooling can be more simple: here, for example, an inner cooling with gas or only an outer cooling of the stator with liquid or gas is enough.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: the stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used, or no such pickup at all is needed.

An invertor 17 provides the windings of the stator 8 of the electric machine 4, at a very high clock frequency (e.g., 10–100 kHz), with sine-evaluated pulse width modulated voltage pulses, which under the action of the machine's inductance basically yield sinusoidal three-phase currents, whose amplitude, frequency and phase are freely selectable.

The invertor 17 is a voltage intermediate-circuit pulse invertor and comprises three subassemblies: a dc voltage converter 18 (input assembly), which converts dc voltage from a low level (here, 12 V) to a higher intermediate circuit level (here, 350 V) or back again, an electrical intermediate circuit accumulator 19, here, a capacitor or an arrangement of parallel-switched capacitors, and a machine invertor 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the invertor 17 are hermetically enclosed in a shielding housing 21, which is filled with a suitable boiling type coolant. This is, for example, a fluorohydrocarbon, having a suitable boiling point, e.g., 60 C., at a suitable pressure (say, between 50 mbar and 3 bar). Evaporated coolant can condense in a condensation cooler 22 and return to the housing 21 in liquid form in a hermetically-sealed circuit.

The dc voltage converter 18 is connected, at the low-voltage side, with the vehicle's battery 11 and various low-voltage consumers 23, such as lighting and electronic devices. The invertor 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25. The additional accumulator 24 takes strain off the vehicle's battery 11 when starting the engine 1, since it takes energy only slowly from the battery prior to starting and saves it in the additional accumulator 24. Here, it is then available for fast removal during the starting process. In addition, it can also serve to save that energy which accrues during other brake processes mediated by the electric machine 4. Finally, it has the task of buffering the energy obtained from the rotational nonuniformity reducer in a brake phase and surrendering it again for the following drive phase. For large energy being stored, the additional accumulator 24 can contain a flywheel accumulator 26 in addition or as an alternative.

On the other hand, the (inner) intermediate circuit accumulator 19 has the basic task of providing voltage with the necessary steep rise time for clock purposes—i.e., quickly—to the machine-invertor group 20. It does not need any very high capacitance for this (e.g., it has 2 $\mu$F), and in fact low lead inductances are advantageous for speed purposes, which is ensured by the arrangement in the interior of the invertor 17 (and preferably on the same board on which the electronic switches of the machine-invertor 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own invertor-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the invertor 17 so that it can take on the function of the additional accumulator 24.

The intermediate circuit with its high voltage level (here, 60 V or 350 V) supplies various auxiliary drives 29, such as an air conditioner 29 and servo-drives, as well as various heating devices 30, such as engine and catalyst heaters, with electrical energy. Whereas such high-power consumers are traditionally operated by mechanical coupling from the internal combustion engine 1 or are heated by waste heat from the engine 1, the high-voltage level available here allows a more efficient, purely electrical powering.

A control device 31, through appropriate actuation of its semiconductor switches, instructs the invertor 17 at each moment of time as to the amplitude, frequency, and phase that the alternating voltage generated by it should have.

The control device 31, which can be formed, for example, by a correspondingly programmed microcomputer system, determines in its first step the magnitude and the direction of the torque which the electric machine 4 is supposed to produce at a particular time. It can do this, e.g., by means of a characteristic diagram control system, in that it obtains, as input information from the rotation transformer 16, the angular position of the drive shaft 10, the mean rotary speed at the moment, and possibly other operating parameters, such as the throttle valve position. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained. An energy consumption control unit (not shown) indicates how much energy is needed for charging the vehicle battery 11, for supplying the low-voltage consumers 23 and the high-power consumers 29, 30, so that the control device 31 can provide for a corresponding braking torque. A motor control unit 33 tells the control device 31 whether and to what extent the electric machine 4 is supposed to provide additional acceleration or braking of the vehicle, so that it can generate a corresponding torque, perhaps for smoothing out the instantaneous characteristic curve of the engine 1 (e.g., to fill up a "turbo-gap" at low speeds of rotation). Accordingly, an ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. The motor control unit 33 can also implement an automatic start-stop control and tell the control device 31 whether the electric machine 4 should start the engine 1.

The active reduction of rotational nonuniformities can be controlled such that it determines from a memorized characteristic diagram the rotational nonuniformity to be expected at the moment, as a function of the above-mentioned operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, or by picking up the instantaneous torque of the engine 1 by means of a torque hub (not shown) in the drive train. A combination of automatic and open-loop control is also possible. From the value thus determined for the instantaneous rotational nonuniformity, a corresponding (opposite-phase) value is derived for the rapidly changing nominal torque of the electric machine 4, which may be additively superimposed onto the braking (or possibly driving) constant torque.

In a second step, the control device 31 determines which amplitude, frequency, and phase of the voltage or current must be provided by the invertor 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor, or is derived from electric quantities.

In FIG. 1, the control device 31 is shown as being arranged outside the invertor housing 21. In order to participate in the boiling bath cooling, however, it is arranged inside the invertor housing 21 in other configurations (not shown).

The control device 31 can share various sensors serving to carry out its control tasks and sensor information derived from them with a motor control unit 33 to control the engine 1. For example, these can be the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

The energy obtained from braking during the additional functions is kept for the interim in the additional accumulator 24, to be re-used for subsequent powering of the electric machine 4 or supplied to the vehicle battery 11.

Figure 2A:
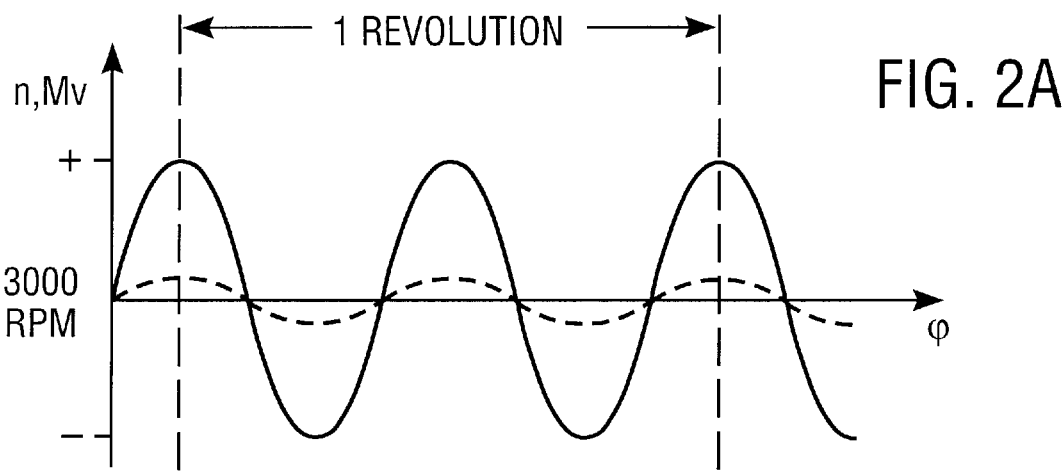
FIG. 2 a sample schematic representation of the mode of functioning of the starter/generator with additional function of "active vibration dampening"
Figure 2B:
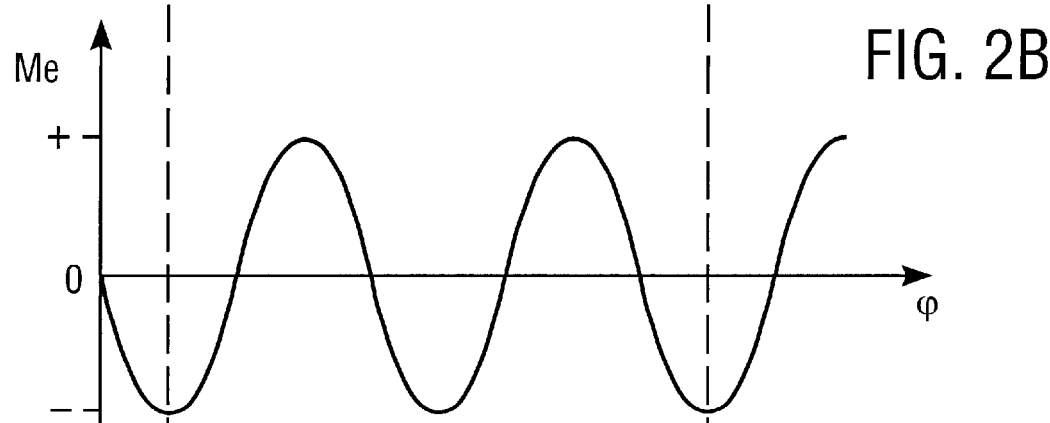
Figure 2C:
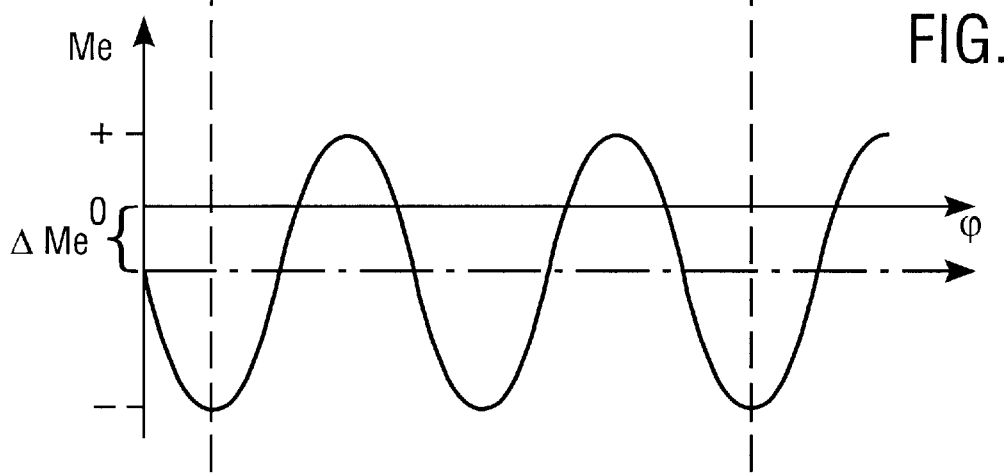

FIGS. 2A–2C illustrate the generator operation along with the additional function "active vibration dampening". FIG. 2A shows (by solid line) the rotary speed n of the crankshaft 10 as a function of the crankshaft angle. The shaft periodically executes speed fluctuations toward smaller and larger speeds about a mean speed (here, 3000 revolutions per minute), which in this idealized example have a basically sinusoidal appearance overall. These are rotational nonuniformities resulting from the gas and mass forces, which appear here in the second order (i.e., at a frequency of 100 Hz). For better comprehension, the angle interval needed for one revolution of the shaft is also shown. There are fluctuations in the torque Mv of the engine about a mean torque, basically proportional to the rotational nonuniformities. The solid line in FIG. 2A also illustrates the curve of the engine torque Mv as a function of the crankshaft angle.

FIG. 2B shows the torque Me applied by the electric machine 4 as a function of the shaft angle, while for better clarity the braking torque component belonging to the generator function is not yet shown. The curve of the machine torque Me is essentially equal in magnitude but opposite in phase to the rotational nonuniformity and the engine torque Mv. As a result, the rotational nonuniformity—and the fluctuation of the torque Mv proportional to it—is substantially reduced or even virtually disappears, as is illustrated in FIG. 2A by the broken line.

In FIG. 2B, the negative and positive torque extreme are equal in magnitude. Thus, the energy obtained during a braking phase is essentially equal to the energy used up in the following drive phase. Therefore, the outward energy flux is zero, and brake energy is only buffered temporarily inside the system. Thus, the system works like a pure rotational nonuniformity reducer with rapidly varying torque, without generator function.

FIG. 2C shows the superpositioning of both functions: the generator function shifts the torque per FIG. 2B overall by a particular amount Me (the so-called deviation) in the negative direction. The deviation Me will generally vary slowly, but in the brief time frame represented here of approximately one period of rotation it is constant to a good approximation. For the generator powers generally required, it is smaller than the amplitude of the rapid variation of the torque, so that the overall torque Me alternately takes on positive and negative values. Averaged over the rapid torque variation, one obtains a constant torque—Me. Thus, on average, mechanical energy is withdrawn from the internal combustion engine, being largely transformed into electrical energy and taken out of the system for the charging of the car battery 11 and/or for the operating of electrical consumers 23, 29, 30. In pure generator function without vibration dampening, the electric machine 4 generates a constant torque, corresponding to the dot-and-dash line Me in FIG. 2C.

If, for example, during braking of the vehicle, the deviation Me is greater than the amplitude for reducing the rotational nonuniformity, the electric machine 4 will only work as a brake and no longer as a drive. The overall torque curve can also be shifted in the positive direction (positive deviation). The electric machine then works as a (driving) motor, to support the engine when accelerating the vehicle, for example.

Both small and very large generator powers can be adjusted simply by an appropriate adjustment of the (software) control system of the electric machine—without any structural (hardware) changes. Only the size of the electric machine and the power electronics is a limitation. Thus, the very same machine type can be used, for example, for small and large vehicle types without design adaptation.

Figure 3:
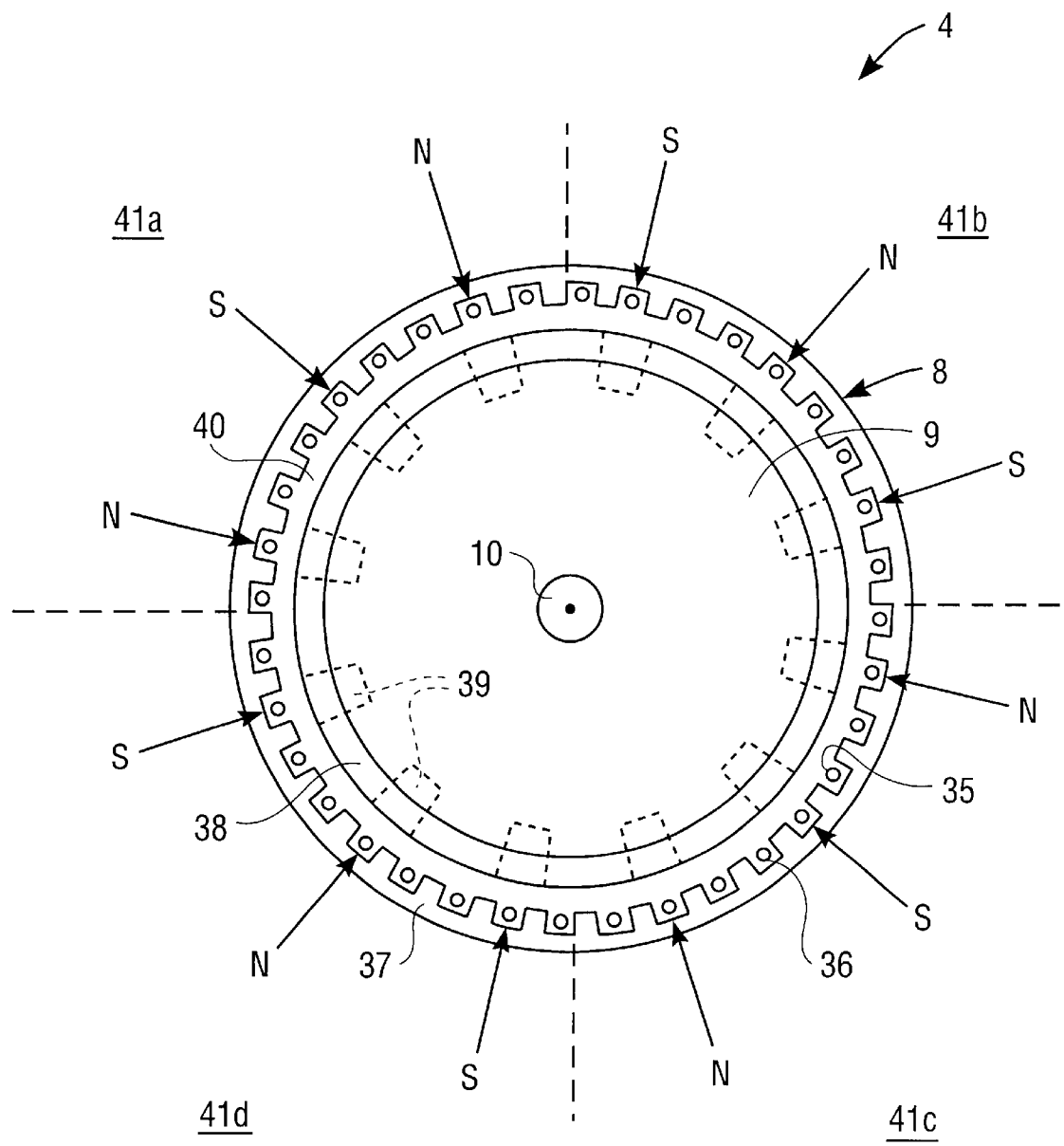
FIG. 3 a schematic cross sectional representation of an electric machine with plane of sectioning perpendicular to the axial direction.

The electric machine 4, shown more closely in FIG. 3, has no brushes or wiper and is thus free of wear. It has an outer diameter of around 300 mm and a length in axial direction of 70 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray flux effects.) The poles revolve in circular motion in the stator 8 with the rotary-current oscillation. Their momentary position at a particular time is shown by arrows carrying the designations "S" (for south pole) and "N" (for north pole). A backing piece 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor poles (reference number 39). Current to energize the rotor winding (not shown), which produces these poles, is supplied to the rotor by slip rings.

The air gap 40 between rotor 9 and stator 8 is relatively large; its width here is 1 mm.

In other configurations (not shown), the rotor is exterior and the stator is interior.

Figure 4:
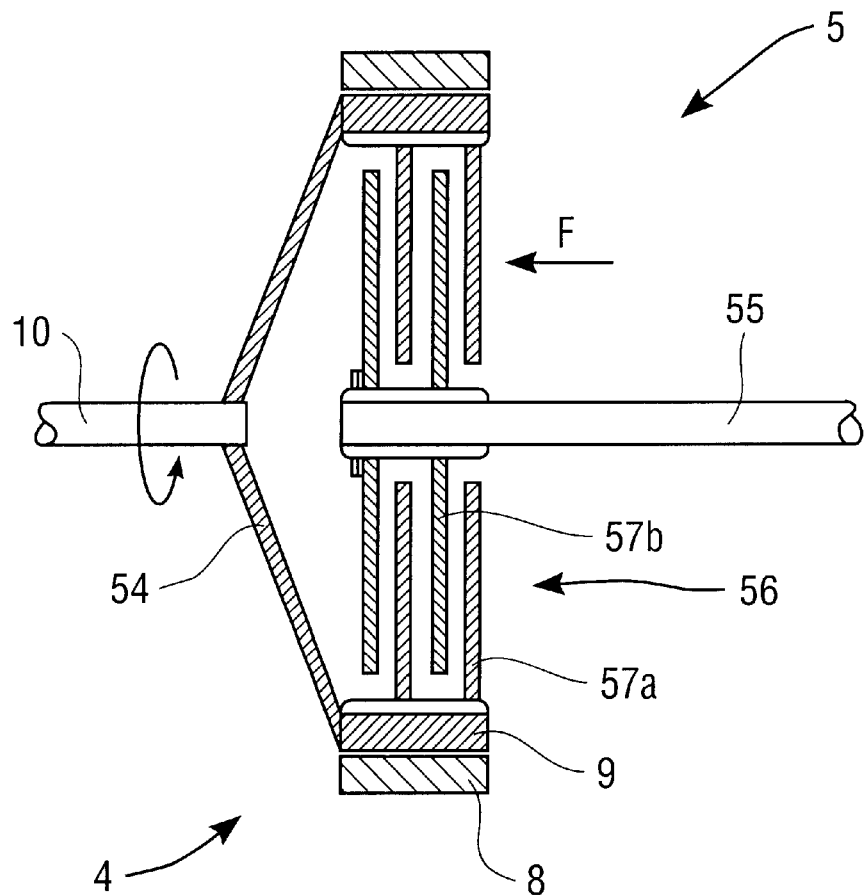
FIG. 4 a schematic cross sectional representation of an electric machine with integrated frictional coupling with plane of sectioning in the axial direction.

In the configuration per FIG. 4, the coupling 5 is almost completely integrated into the electric machine 4. Inside the stator 8, firmly mounted for example on the engine or transmission housing, the rotor 9 is firmly joined at one end by its periphery to the drive shaft 10 of the internal combustion engine 1 by means of an axially and laterally protruding cage 54. The rotor 9 is hollow on the inside and essentially has the form of a flat round cylinder. The coupling 5—here, a multidisk (multisurface frictional disk clutch) coupling functioning as a drive coupling—is arranged in the cavity. This can provide a frictional connection between the drive shaft 10 with the rotor 9 and a takeoff shaft 55 to the transmission 6, protruding into the cavity. For this, the rotor 9 has internal gearing and the takeoff shaft 55 has external gearing in the area of the cavity 55. In the space in between is arranged a set of disks 56, whose disks 57 are alternately externally and internally geared, so that one disk is frictionally joined to the rotor 9 (outer disk 57*a*) and the next disk is joined to the takeoff shaft 55 (inner disk 57*b*) in alternating manner. Without axial pressure, the outer and inner disks 57*a*, 57*b* can rotate almost freely against each other, and the shafts 10, 55 are then decoupled. If one pushes together the outer and inner disks 57*a*, 57*b* by means of a pressure device (not shown) (for example, an angled lever) in the axial direction, the resulting frictional forces provide the connection between the shafts 10, 55, so that the torque generated by the engine 1 and the electric machine 4 is transmitted to the takeoff shaft 55. The frictional connection piece (i.e., the set of disks 56 here) of the clutch 5 is entirely accommodated in the rotor 9, and thus does not protrude from it sideways in the axial direction. The clutch 5 is designed as a wet clutch. The clutch oil simultaneously serves to cool the electric machine 4. In other configurations (not shown), other shiftable frictional clutches are integrated, e.g., a single-disk clutch in wet or dry design.

Figure 5:
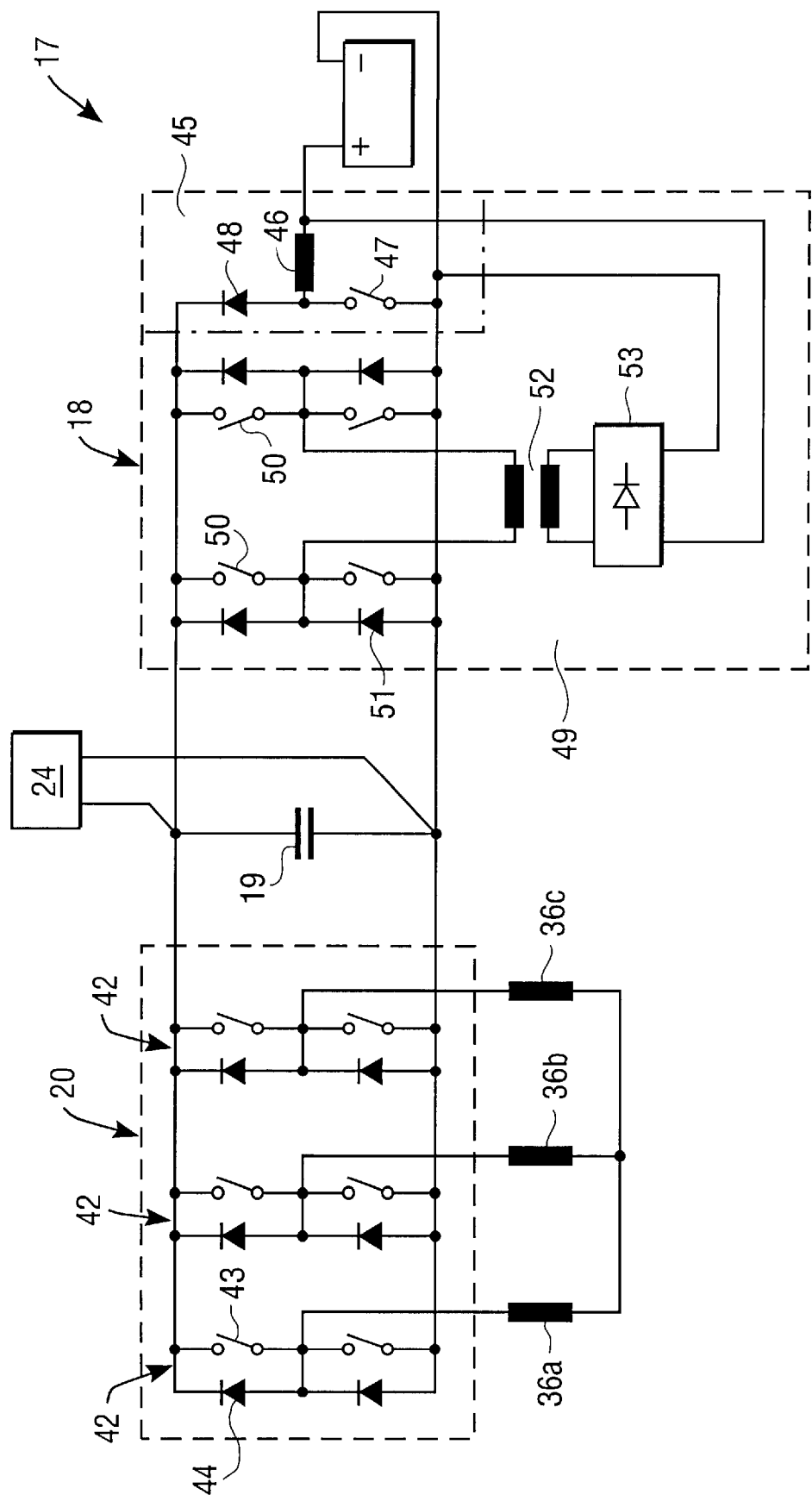
FIG. 5 a schematic circuit diagram of an invertor used in the starter/generator.

FIG. 5 shows a schematic diagram of the invertor 17. One recognizes the intermediate circuit accumulator 19 in the form of a capacitor, which is switched in parallel to the additional accumulator 24 (not shown more closely here). The capacitor symbolizes a parallel connection of several capacitors.

The machine invertor 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) to one end of each of the three windings 36*a*, 36*b*, 36*c* of the three-phase winding 36; at the other end, the three windings 36*a*, 36*b*, 36*c* are joined to each other.

A free-wheeling diode 44 is connected in parallel to each of the switches 43. It is polarized such that it normally blocks and only when the opposite switch is open. does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middles of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

In embodiments with a synchronous machine, one does not need any actively controlled semiconductor switch in the generator operation; in this case, voltage-controlled gates are enough to form a rectifier function. However, higher power is achieved with actively controlled switches.

Figure 6:
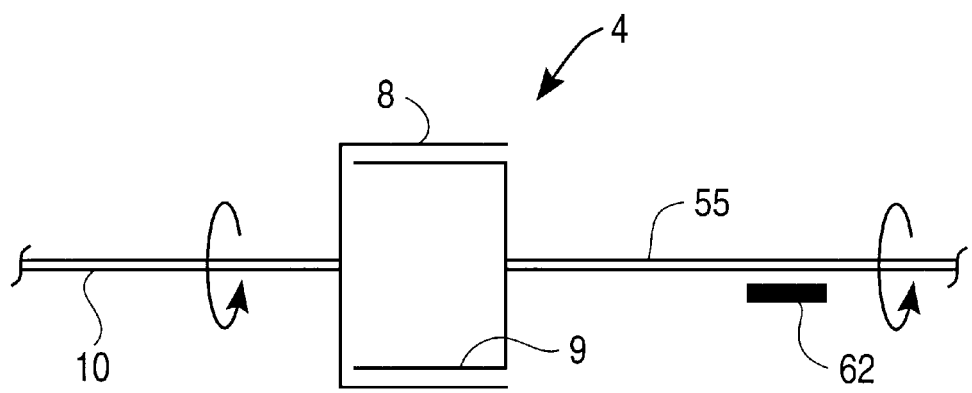
FIG. 6 a schematic representation of an electric machine with electromagnetic operating units that can rotate.

The electric machine 4 of FIG. 6, which has in addition the function of an electromagnetic coupling and/or synchronizing device, has an inner and an outer electromagnetic active element, which are termed here the rotor 9 and the stator 8', borrowing the conventional terminology from electrical machines. The rotor 9 is firmly joined to a takeoff shaft 55, coupled to the transmission 6, for example, and the stator 8' is firmly joined to the drive shaft 10 (in other configurations—not shown—this arrangement is reversed). The electrical machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is propped against the vehicle chassis or the transmission housing. The configuration shown has no bridge coupling, but other configurations (not shown) are outfitted with a frictional or nonpositive-locking bridge coupling for the mechanical connection of the shafts 10, 55.

The electric machine 4 can start the internal combustion engine 1 directly supported against the takeoff shaft 55, secured by the brake 62. The generator function is achieved by a permanently maintained clutch slip.

In the extra function as switching coupling and possibly as starting coupling (apart from the slip for the generator function), a synchronism of the shafts 10, 55 is achieved by such an adjustment of the torque-generating magnetic fields of the machine 4 that a uniform rotary speed prevails between the shafts 10, 55. In an induction machine, this is accomplished, for example, by automatic control or open-loop control of the magnetic slip of a rotary field of suitable frequency and amplitude, turning opposite the direction of the drive torque.

Additional acceleration or braking is possible by generating appropriate torques—or in other words—smaller or larger clutch slips. The electric machine 4 can be involved in an ASR control such that, when the drive wheel slip is too large, the clutch slip is instantaneously increased and, thus, the moment applied to the drive wheels is reduced.

A reduction of rotational nonuniformities of the drive shaft 10 can occur with the vehicle at standstill, thrusting against the rotor 9 which is then prevented from turning by means of the brake 62. When moving under power, rotational nonuniformities can be reduced by rapid variation of the transmitted torque, specifically, by reducing and increasing the clutch slip.

What is claimed is:

1. A drive system for a motor vehicle, comprising:
   a drive train comprising a transmission;
   an internal combustion engine having a drive shaft and acting on the drive train;
   an electric machine which is a combined starter for the internal combustion engine and generator for the motor vehicle, the electric machine having a rotor which is permanently coupled to the drive shaft, so that the drive shaft and the rotor always rotate in unison with the same rotational speed, wherein the electric machine is an internal rotor machine; and
   a single clutch, which is arranged in the drive train between the rotor of the electric machine and the transmission, wherein the clutch is a frictional clutch having at least two frictional connection elements rotating with the rotor and at least two frictional connection elements rotating with the transmission, wherein the frictional connection elements are immersed in a clutch fluid, and wherein the clutch is mounted in the rotor of the electric machine.

2. The drive system of claim 1, wherein the electric machine is an induction machine.

3. The drive system of claim 1, wherein the clutch fluid simultaneously acts to cool the electric machine.

4. The drive system of claim 1, wherein the clutch is completely integrated in the rotor of the electric machine.

* * * * *